Figure 11:
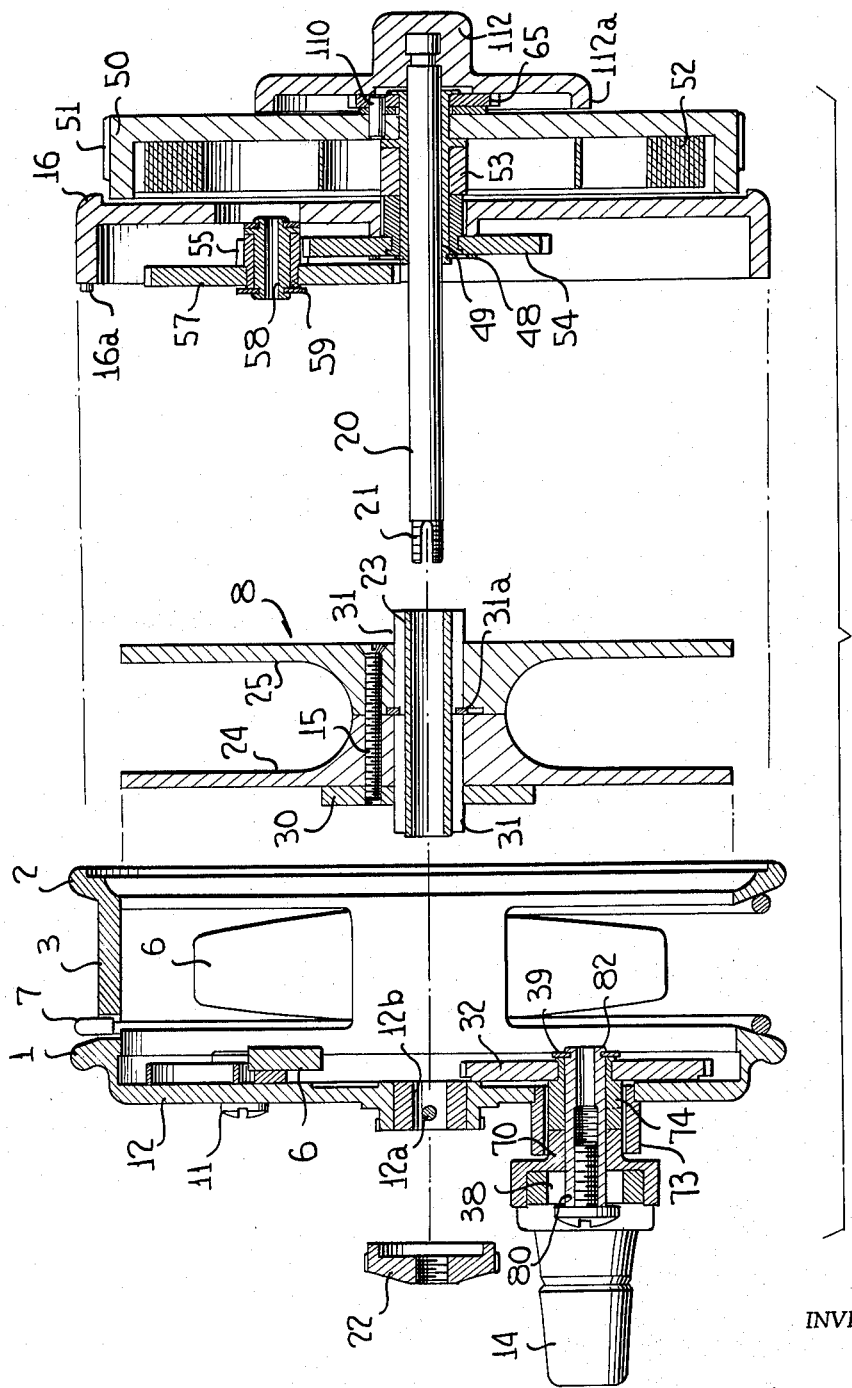

May 17, 1966  R. C. W. NEALE  3,251,564
SPRING OPERATED FISHING REEL
Filed Sept. 14, 1964  4 Sheets-Sheet 1
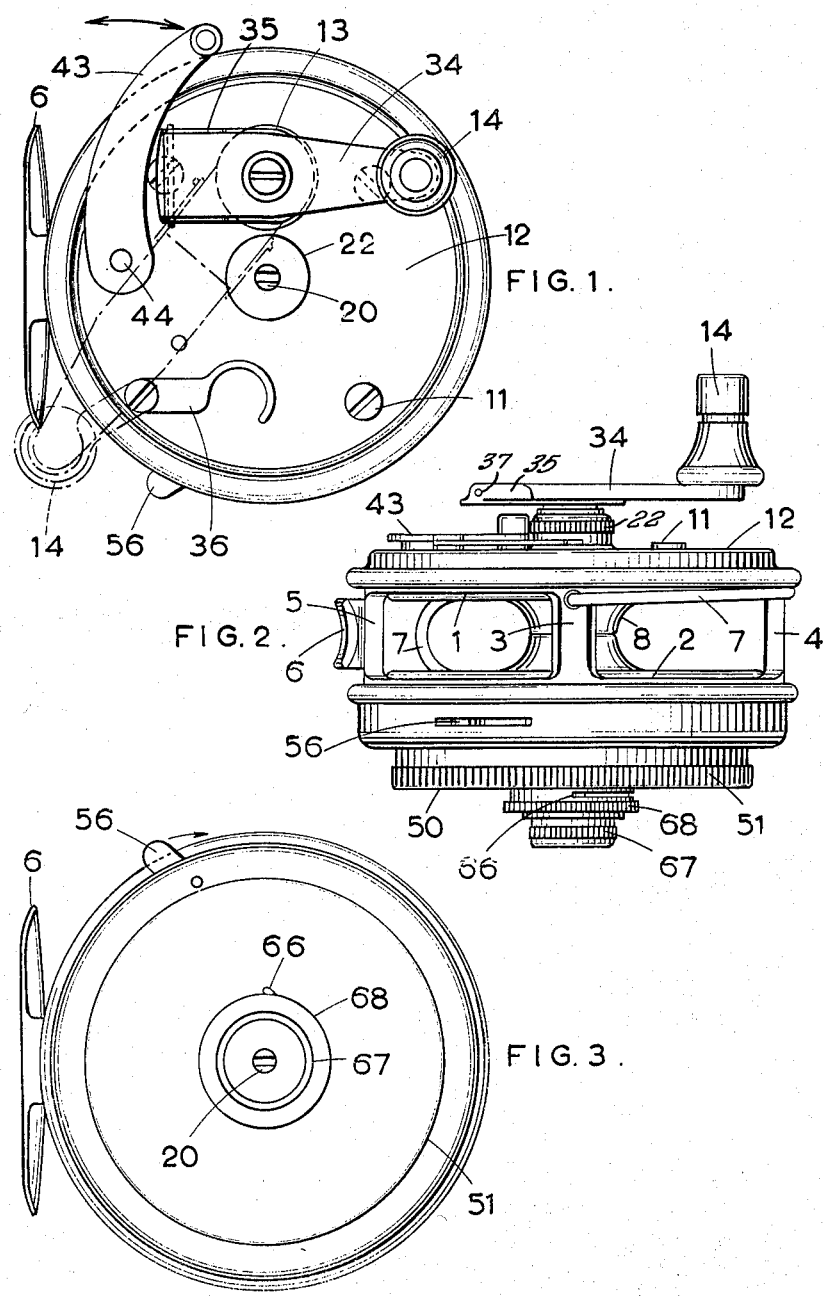
INVENTOR
Robert Charles William Neale
BY
Shoemaker and Mattare
ATTORNEYS

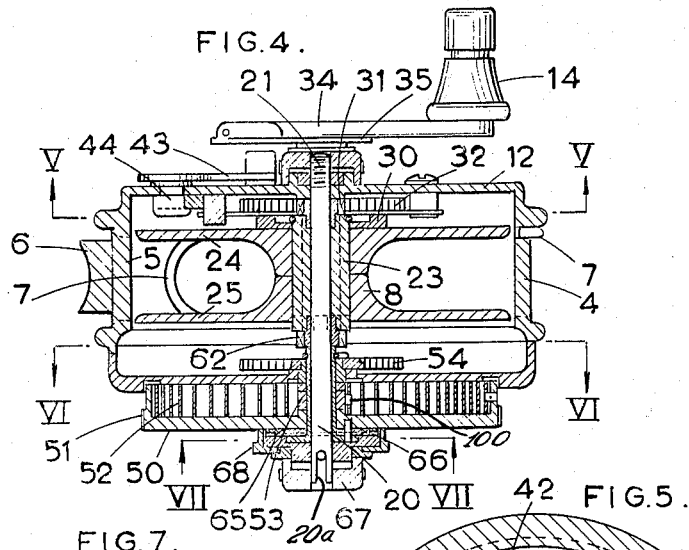
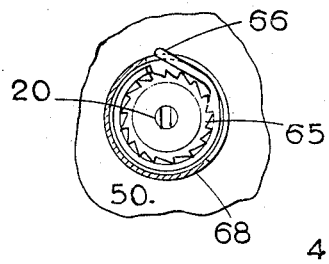
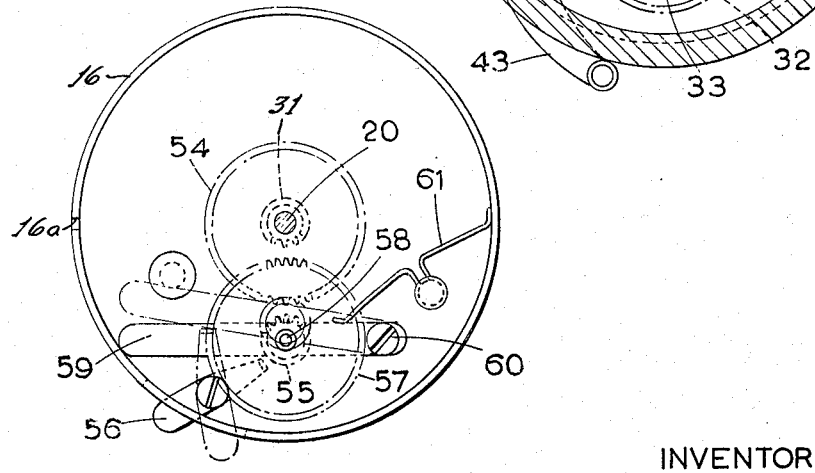

May 17, 1966  R. C. W. NEALE  3,251,564
SPRING OPERATED FISHING REEL
Filed Sept. 14, 1964  4 Sheets-Sheet 3
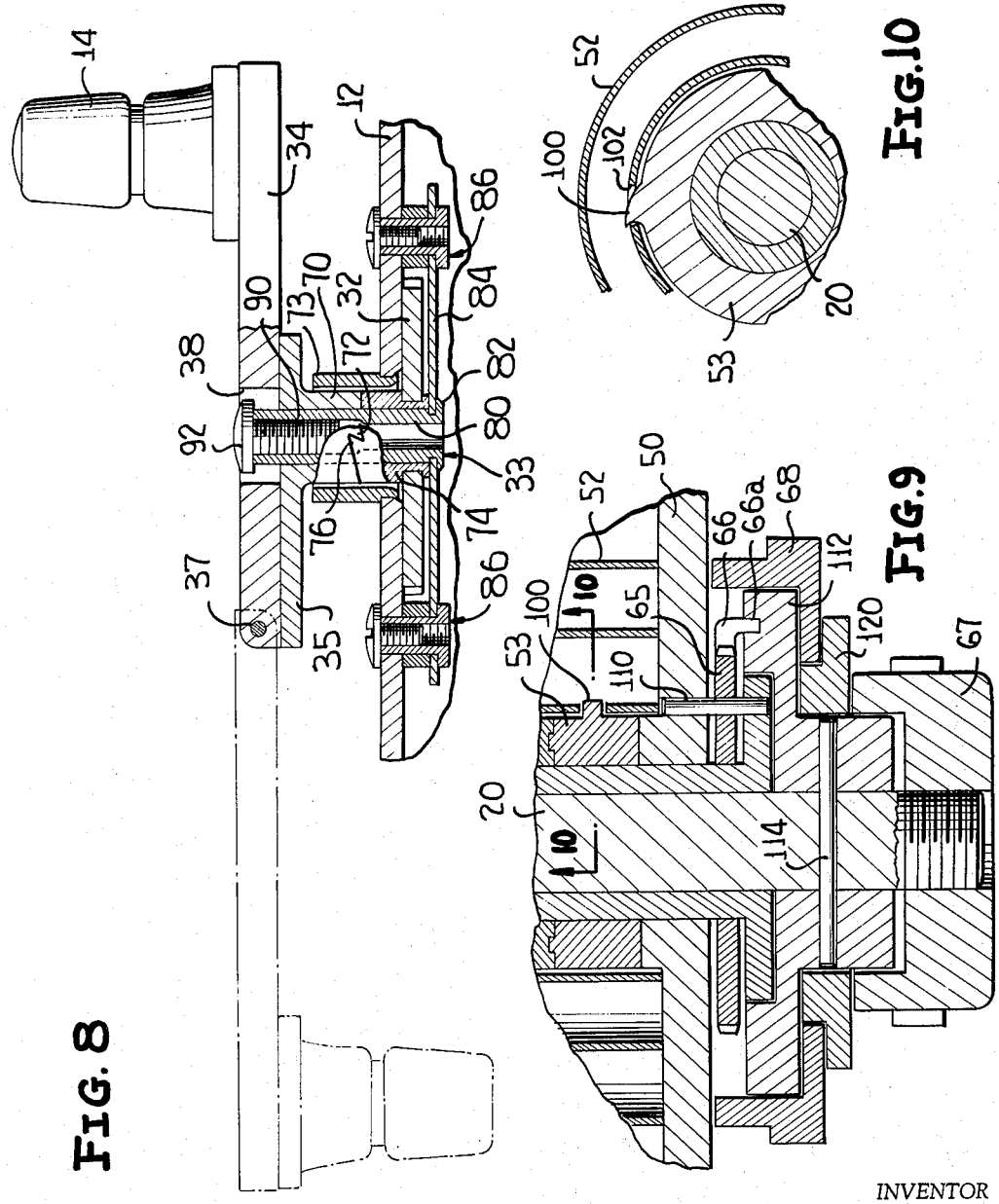
INVENTOR
Robert C.W. Neale
BY Shoemaker and Mattare
ATTORNEYS May 17, 1966  R. C. W. NEALE  3,251,564
SPRING OPERATED FISHING REEL
Filed Sept. 14, 1964  4 Sheets-Sheet 4

INVENTOR
Robert C.W. Neale
BY Shoemaker and Mattare
ATTORNEYS 3,251,564
SPRING OPERATED FISHING REEL
Robert Charles William Neale, Bourton-on-the-Water,
England; Frederick Hedley Nicholson and Frank D. M.
Longden, executors of said Robert Charles William
Neale, deceased
Filed Sept. 14, 1964, Ser. No. 397,069
9 Claims. (Cl. 242—84.3)

The present invention is a continuation-in-part of co-pending U.S. patent application Serial No. 176,747, filed March 1, 1962, now abandoned.

This invention relates to fishing reels and has more especial reference to those having and over-running clutch, free-wheel or other device permitting rotation of the spool in a direction to draw in the line while the handle remains stationary.

Up to the present time it has been customary for fishermen to utilize a specific type of fishing reel limited in its use according to the nature of the fishing and the type of bait used. For instance, a fishing reel used for fresh water fishing for trout or salmon could not reasonably be expected to have a sufficient line capacity and perform as a reel for sea fishing; or a spinning reel may not necessarily lend itself for bottom fishing, and the present invention provides a fishing reel which will serve efficiently for sea fishing, bottom fishing or fly fishing.

The invention also provides, in addition to the usual manual method of line recovery, a fully automatic method for returning the fishing line to the spool or drum, so that the reel can be used as a fully automatic reel or a completely free spool reel or a free spool reel with an automatic drag and no over-run, or a hand-controlled spool reel.

Broadly stated the invention provides in association with a fishing reel having an over-running clutch, free wheel or other device permitting rotation of the spool in a direction to draw in the line while the handle remains stationary, a housing containing a spring which may be clutched to the spool through reduction gearing to wind up the spring as the line is paid out.

Preferably also, a manually-controlled brake or conventional lever-controlled check is provided for the spool, as well as separate control of the automatic gear enabling optional use of the spring wind-up when playing fish.

Advantageously, the handle mechanism is so arranged that the handle does not have to rotate except when required for line recovery and so that it may be used to assist the automatic spring gear if desired and conveniently the handle is foldable to a disengaged position, where it can be held by a retaining hook when casting or space saving.

One embodiment of the invention comprises a drum or spool mounted on a spindle carried in fixed housings located with a sping operating automatically and having the usual conventional or appropriate fittings for attaching the assembly to a rod. A self-disconnecting spring operated handle for manual operation of the spool is situated on one side of the body, and is fitted with a suitable reduction gear to the spool. A friction pad bears on a drum to act as a brake for the spool when its fingerpiece is operated. This brake may be adjustable to give a clamp grip on the spool or through a complete range to brake completely off.

On the other side of the reel a circular housing containing a spring, suitably a volute spring, is mounted on the spindle, the exterior edge of the housing being serrated or otherwise formed for use as a hand-piece to wind up the spring if desired, or to rotate the spool in a direction to retrieve line. The spring is secured to the housing at one of its ends and to a suitable clutch device at the other end, either a coil spring clutch or a pawl and gear ratchet or a spring operated pawl operating in the main spring housing case. The spring may be wound either by hand or upon rotation of the dru, i.e. when line is being drawn off the reel by hand for casting or by a fish, and the spindle is driven from the spring by either a 16:1, 9:1 or other suitable reduction gear operating from a hook camshaft carried on the shaft of the first driving gear.

When the spring device is clutched-in and the handle disengaged and the brake slide in the free position, a fish on the end of the line can be played by the spring. Should the fish allow the line to slacken, the spring will revolve the spool and retract the line. However, if the pull on the line requires it to be paid out whilst the spring is clutched-in, a manual release mechanism allows the spring to unwind instantaneously and the rewinding process recommences.

The invention will be further described with reference to the accompanying drawings where one embodiment is illustrated by way of example and wherein:

FIG. 1 is a front view of the improved reel;
FIG. 2 is a side elevation;
FIG. 3 is a rear view;
FIG. 4 is a vertical section;
FIG. 5 cross-sectional on the line V—V of FIG. 4;
FIG. 6 is a similar sectional view on the line VI—VI of FIG. 4;
FIG. 7 is a detail of the ratchet coupling the spring housing to the central shaft;
FIG. 8 is an enlarged sectional view illustrating the details of construction of the over-running cluth mechanism of the invention;
FIG. 9 is an enlarged sectional view illustrating the details of construction of the components at one end of the central spindle of the apparatus;
FIG. 10 is a sectional view taken substantially along line 10—10 of FIG. 9 looking in the direction of the arrows; and
FIG. 11 is a sectional view of a slightly modified embodiment showing the main components of the reel separated from one another to enable the line spool to be exchanged.

Referring now to the drawings, but first more particularly to FIGS. 1 to 3, the reel illustrated includes a circular frame having two rings 1 and 2 bridged by cross members 3, 4 and 5, the latter mounting a saddle 6 by which the reel may be secured to a fishing rod by the conventional ferrules or in other appropriate manner.

7 is a line guard of wire conforming to the circular frame and carried by the cross member 3, and 8 generally designates a spool for the line (not shown) which spool is rotatably mounted in the frame, between its rings 1 and 2, in the manner hereafter described.

Integral with the frame ring 1 is a drum 12 defining a first casing wall carrying a handle or crank bearing 13 for a handle 14, which, as shown more clearly in FIGURE 1 is offset from the center of the reel. A similar drum 16, defining a second casing wall, is connected to ring 2.

Passing axially through the centre of the reel is a fixed central shaft 20 a portion of which projecting outwardly through the drum 12 is screw threaded at 21 to mount a knurled nut 22. A pin 12a fixed to drum 12 is engageable in slot 20a of the shaft 20 to prevent rotation of the housing relative to the shaft.

These components are shown also in FIGURE 4 where it will be seen that the shaft 20 provides a stationary central journal for a bush 23 carrying the spool 8 which has two radial flanges 24 and 25.

Mounted for rotation about the central shaft 20 and fixed within the bush 23 is a splined sleeve 31. Enmeshed with the sleeve 31 is a gear wheel 32 on a shaft 33. The handle 14 has a crank 34 pivoted to a second crank 35 by means of a pin 37 so that it may be swung from its operative position shown in full lines in FIGS. 1 and 8 to its out of use position shown in dotted lines where it can be temporarily retained by a hook 36. The second crank 35 is provided with integral upstanding opposite side wall portions, and the main body of crank 34 is adapted to be received between these wall portions. These side wall portions on member 35 engage crank 34 in the full line position so that turning of the crank 34 will also produce turning of crank 35 due to the interengagement of the side edges of crank 34 with the side wall portions of crank 35. Crank 34 is also provided with a centrally located hole 38 to provide clearance with certain components hereinafter described.

Referring now particularly to FIG. 8 of the drawings, crank 35 is provided with a substantially cylindrical depending portion 70 which has a plurality of ratchet-like teeth 72 formed on the lower end thereof. A substantially cylindrical member 74 is fixedly attached to gear wheel 32 and is provided with correspondingly shaped ratchet-like teeth 76 which are adapted to cooperate with the teeth 72 so as to provide a positive driving interconnection upon one direction of rotation of member 70 and to provide an over-running effect in the opposite direction as will be well understood. Members 70 and 74 are each supported within a sleeve portion 73 mounted upon drum 12.

The shaft indicated generally by reference numeral 33 comprises a generally tubular member 80 having one end portion 82 thereof fixedly attached to a bar 84 which is supported between a pair of stud mounting assemblies 86 which serve to fixedly support bar 84 in spaced relationship to the drum 12.

Each of portions 70 and 74 is rotatably supported upon the outer surface of tubular member 80. The upper portion of tubular member 80 is counterbored as indicated at 90 and is provided with internal threads adapted to receive the threaded shank of a headed screw 92. This screw 92 serves to retain the handle in operative position and yet permits limited movement of the portions 35 and 70 upwardly as seen in FIG. 8 upon over-running coaction of the clutch member 70 and 74.

When handle 14 is rotated in a clockwise direction as seen in FIG. 1, it causes rotation of the gear wheel 32 enmeshed with the sleeve 31 so that the bush 23 and spool 8 are rotated at four times the speed of the handle with te gear ratio illustrated in a direction to take in line.

The handle 14 is adapted to rotate freely in a counter-clockwise direction as seen in FIG. 1 due to the interaction of the over-running clutch mechanism aforedescribed. It is apparent that this over-running clutch apparatus may take different forms, the particular modification shown being illustrated only. This free reel clutch also permits rotation of a spool 8 in a direction to draw in line, while the handle remains stationary.

Adapted to bear on the periphery of a drum 30 secured to the spool 8 is a brake shoe 40 carried by a bell crank 41 and urged by a leaf spring 42 in the direction of the drum 30. 43 is a brake lever or finger-piece pivoted at 44 and having a cam 45, by which the brake shoe 40 can, on manipulation of the lever or finger-piece 43 outwardly from the position shown in FIGURES 1 and 5, be moved from the brake-on position shown to a disengaged position in which the spool is free.

Leaf spring 42 is secured to drum 12 by a screw 11.

The fixed shaft 20 carries on the outer side of the frame ring 2 the automatic mechanism now to be described. Within a rotatable drum 50 having a milled edge 51 to facilitate manipulation is a volute clock-type spring 52 coiled around a central arbor 53 free on the shaft 20 and with its outer end secured to the drum 50. The arbor 53 as seen in FIGURE 10 is provided with a cam-type dog 100 which is adapted to engage with the walls of an aperture 102 formed in the innermost coil of spring 52. The shape of the dog 100 is such that when the winding handle 14 is turned clockwise in FIGURE 1 to rotate reel 8, and while the lever 59 is in the right hand position of FIGURE 6 to couple the arbor 53 with the reel 8, the cam side of the dog 100 may cam the dog out of the aperture 102 so as to override the spring.

The arbor 53 has a gear wheel 54 arranged to be enmeshed with a pinion 55 to couple the automatic mechanism to the spool 8, when a hand lever 56 as shown more clearly in FIGURE 6 is moved to its operative position shown to the right of this figure. Ratatable with the pinion 55 is another gear wheel 57 both on a shaft 58 carried by a lever 59 pivoted at 60 to a fixed housing 16. The lever 59 is urged by a spring 61 to disengage the gear train when the hand lever 56 is in the position shown to the left in FIGURE 6.

The gear wheel 57 is adapted to be brought into driving connection with the splined shaft 31, the arrangement being such that with the hand lever 56 in the operative position, when the spool 8 is rotated in a direction to pay out line, e.g. when playing fish, it is coupled to the arbor 53 by the gear train at a reduction ratio of 16:1 in the embodiment illustrated, and thus winds up the spring.

The automatic gear when the spring 52 is wound tends to draw in line and, with the brake lever 43 in the "off" position, the spring rotates the spool to draw in line immediately the fish ceases the tension therein.

The spring 52 can also be wound by hand rotation of the drum 50 in a clockwise direction, it being understood that the automatic or clockwise mechanism can at any time be disengaged from the spool 8 to leave the latter free or under control of the brake 43 by manipulating the hand lever 56.

Referring to FIGS. 7 and 9, the ratchet mechanism mounted externally of drum 50 for preventing it rotating in a counter-clockwise direction is illustrated. This mechanism includes a ratchet wheel 65 which is fixed for rotation with the drum 50 through the intermediary of a pin 110 tightly fitted within aligned openings formed in members 65 and 50.

A pawl means 66 includes a conventional pawl portion for engaging the outer portion of the ratchet wheel 65, one end portion 66a of the pawl means being bent laterally and fixed within a cooperating opening provided in a cap member 112 which is in turn fixed to shaft 20 by means of a pin 114 which is snugly fitted within aligned openings provided in members 112 and 20.

Release of the pawl 66 is effected by partially rotating a milled ring 68, and such release allows the drum 50 to rotate in a counter-clockwise direction as viewed in FIG. 3 and the clock spring 52 thus to unwind even though gears 54, 55, 57 and 62 of the train remain enmeshed.

The pawl 66 is positively released by such partial rotation of the milled ring 68, in which condition the drum 50 remains free to rotate in a counter-clockwise direction and it being connected to the spool 8 through the gear train thereby provides an over-run eliminator for the spool without winding up the spring 52.

By returning the milled ring 68 to its normal position, counter-clockwise rotation of the drum is prevented and the spring 52 is automatically re-engaged.

An end cap 67 is threaded on to the outer threaded end of spindle 20, and a bearing 120 is interposed between end cap 67 and the movable milled ring 68.

Referring now to the embodiment shown in FIG. 11 the pawl mechanism is considerably simplified in that the cap 112 which carries the pawl is swaged on to the end of shaft 20. The finger piece (not shown) of the pawl 66 protrudes through a slot (not shown) in a lateral flange 112a provided on the cap 112. This construction eliminates the necessity for elements 67, 68, 114 and 120 of the embodiment illustrated in FIGURES 1 to 10.

In this embodiment also it will be seen that the drum 50, the arbor 53, the gear wheel 54 and the ratchet wheel 65 are secured on a bearing sleeve 49 by means of a spring clip 48, the sleeve 49 being journalled on the shaft 20.

Again in FIGURE 11 is shown a lug 16a on housing 16 which engages in a depression (not shown) provided on frame ring 2 when the reel components are assembled and prevents rotation of the housing 16 relative to the frame and the shaft 20.

FIG. 11 also shows how, on removal of the nut 22, the shaft 20 can be withdrawn from the central aperture 12b of the drum 12. Following this the line spool 8 may be withdrawn from the shaft 20 and replaced by a similar spool carrying a different line. In this way the angler may readily substitute a spool carrying a line of a different texture, material or strength to suit the particular type of fish or method of fishing in hand.

Finally FIGURE 11 shows the spool itself in greater detail and it will be seen that the two radial flanges 24 and 25 are assembled over the splined sleeve 31, keyed thereto at 31a and secured together and to the brake drum 30 by a screw 15.

By the present invention, an improved fishing reel is provided either for use in the conventional manner, or with automatic line retraction suitable for bottom or fly-fishing.

The embodiments of the invention in which an exclusive property or privilege is claimed are defined as follows:

1. A fishing reel comprising:
  (a) a frame having spaced apart walls and a connecting spool support,
  (b) a spool carried by said support,
  (c) a brake carried adjacent a first of said walls and including a spring to bias the brake into engagement with said spool,
  (d) manual operable means selectively to move and lock said brake out of engagement with said spool,
  (e) a hand crank and shaft rotatably supported in said first wall,
  (f) gear means connecting said shaft with said spool,
  (g)) said shaft including an over-running clutch transferring rotation of said crank to said gear means and spool in the winding direction while providing for rotation of the spool independent of said crank,
  (h) a spring means carried by a second of said walls,
  (i) manual means to place the spring means under tension,
  (j) a gear train carried by the second wall adjacent said spool and drivingly connecting said spring means and spool,
  (k) means mounting a gear of said gear train for lateral movement to a position disengaged from the remainder of the gear train whereby said spool can be selectively rotated in the winding direction by said crank independently of said spring means or by said spring means independently of said crank.

2. Apparatus as defined in claim 1, wherein the said manual operable means employed for moving and locking the brake out of engagement with the spool includes a cam operated pivoted lever.

3. Apparatus as defined in claim 1, wherein said connecting spool support includes a fixed central shaft extending through said spaced walls, means on the ends of said shaft removably tieing the walls of the frame together, and one of said last named means including an open ended pin receiving slot in one end of the shaft and a nut threaded on said last named end of the shaft outwardly of the inner end of the slot whereby, upon removal of the nut, the walls may separated to allow replacement of the spool.

4. Apparatus as defined in claim 1 wherein one end of said spring means is operatively connected with a portion of said gear train through an overriding driving connection whereby the spool is adapted to over-run the spring means while said gear train is operatively engaged.

5. Apparatus as defined in claim 1 wherein said spring means includes a rotary drum and an one-way clutch mechanism drivingly connecting said drum with said frame for preventing the drum from rotating in one direction relative to the frame.

6. Apparatus as defined in claim 5 including means for selectively releasing said last-mentioned one-way clutch mechanism.

7. A fishing reel as defined in claim 1 wherein the spring means is a volute spring disposed about the shaft and having an inner end operatively connected with a portion of said gear train through an over-riding driving connection whereby the spool is adapted to over-run the spring means while the gear train is operatively engaged.

8. A fishing reel according to claim 7, wherein the volute spring has an outer end fixed to a drum which is mounted for revolution about the shaft and including a pawl and a ratchet mechanism operatively connected between the drum and the shaft to permit the drum to be rotated relative to the shaft in one direction only.

9. A fishing reel according to claim 8, including means for selectively releasing the pawl from the ratchet mechanism to permit rotation of the drum relative to the shaft in both directions.

References Cited by the Examiner

UNITED STATES PATENTS

| | | | |
|---|---|---|---|
| Re. 20,995 | 2/1939 | Beasley | 242—84.3 |
| 818,880 | 4/1906 | Ernst et al. | |
| 885,638 | 4/1908 | Newlands | 74—546 |
| 1,307,960 | 6/1919 | Curtis | 74—547 |
| 2,006,482 | 7/1935 | Russell et al. | 242—84.3 |
| 2,310,654 | 2/1943 | Sanborn | 242—84.3 |
| 2,574,718 | 11/1951 | Swigerd | 242—84.45 |

STANLEY N. GILREATH, *Primary Examiner.*

MERVIN STEIN, *Examiner.*

B. S. TAYLOR, *Assistant Examiner.*